United States Patent
Stahlhut et al.

(10) Patent No.: US 7,893,554 B2
(45) Date of Patent: Feb. 22, 2011

(54) TURBO COMPOUNDING SYSTEM

(75) Inventors: Ronnie Dean Stahlhut, Bettendorf, IA (US); Jim Shoemaker, Bettendorf, IA (US)

(73) Assignee: Deere & Company, Moline, IL (US)

( * ) Notice: Subject to any disclaimer, the term of this patent is extended or adjusted under 35 U.S.C. 154(b) by 457 days.

(21) Appl. No.: 12/072,720

(22) Filed: Feb. 28, 2008

(65) Prior Publication Data
US 2009/0218815 A1    Sep. 3, 2009

(51) Int. Cl.
F02B 37/00    (2006.01)

(52) U.S. Cl. .............. 290/52; 290/4 C; 60/597

(58) Field of Classification Search .......... 290/52; 60/598
See application file for complete search history.

(56) References Cited

U.S. PATENT DOCUMENTS

| | | | | |
|---|---|---|---|---|
| 3,406,328 A | * | 10/1968 | Studtmann | 363/41 |
| 4,394,582 A | * | 7/1983 | Kreissl et al. | 290/4 C |
| 4,694,654 A | * | 9/1987 | Kawamura | 60/597 |
| 4,769,993 A | * | 9/1988 | Kawamura | 60/597 |
| 4,973,896 A | * | 11/1990 | Shiga et al. | 322/28 |
| 5,012,172 A | * | 4/1991 | Sember | 318/696 |
| 5,079,913 A | * | 1/1992 | Kishishita | 60/597 |
| 5,381,081 A | * | 1/1995 | Radun | 322/94 |
| 5,703,421 A | * | 12/1997 | Durkin | 310/61 |
| 5,898,246 A | * | 4/1999 | Hoffman | 310/60 R |
| 7,047,743 B1 | | 5/2006 | Stahlhut et al. | |
| 7,276,815 B2 | * | 10/2007 | Algrain et al. | 307/80 |
| 7,593,828 B2 | * | 9/2009 | Wang et al. | 702/138 |
| 7,646,178 B1 | * | 1/2010 | Fradella | 322/46 |
| 2007/0210583 A1 | | 9/2007 | Stahlhut et al. | |
| 2007/0210584 A1 | | 9/2007 | Stahlhut et al. | |
| 2007/0246942 A1 | | 10/2007 | Stahlhut et al. | |
| 2007/0278984 A1 | * | 12/2007 | Adra et al. | 318/701 |
| 2009/0205331 A1 | * | 8/2009 | Marsh | 60/599 |
| 2010/0018203 A1 | * | 1/2010 | Richards | 60/598 |
| 2010/0156205 A1 | * | 6/2010 | Davis et al. | 310/46 |
| 2010/0283252 A1 | * | 11/2010 | Fradella | 290/55 |

FOREIGN PATENT DOCUMENTS

| EP | 0 141 634 | 5/1985 |
|---|---|---|
| EP | 0 178 270 | 4/1986 |

OTHER PUBLICATIONS

Inverter (electrical), Wikipedia, Feb. 11, 2008, Internet Citation, Published in: US http://en.wikipedia.org/w/index.php?title+Inverter_(electrical)%oldid=190658595, printed Jul. 27, 2009.

* cited by examiner

*Primary Examiner*—Joseph Waks
(74) *Attorney, Agent, or Firm*—Suiter Swantz pc llo

(57) ABSTRACT

A turbo compounding system may include a turbo generator having a switched reluctance machine having at least one pole-matched rotor and stator pair, a single phase inverter coupled to the turbo generator and further coupled to a direct current link, an inverter coupled to the direct current link, a motor generator coupled to the inverter.

24 Claims, 9 Drawing Sheets

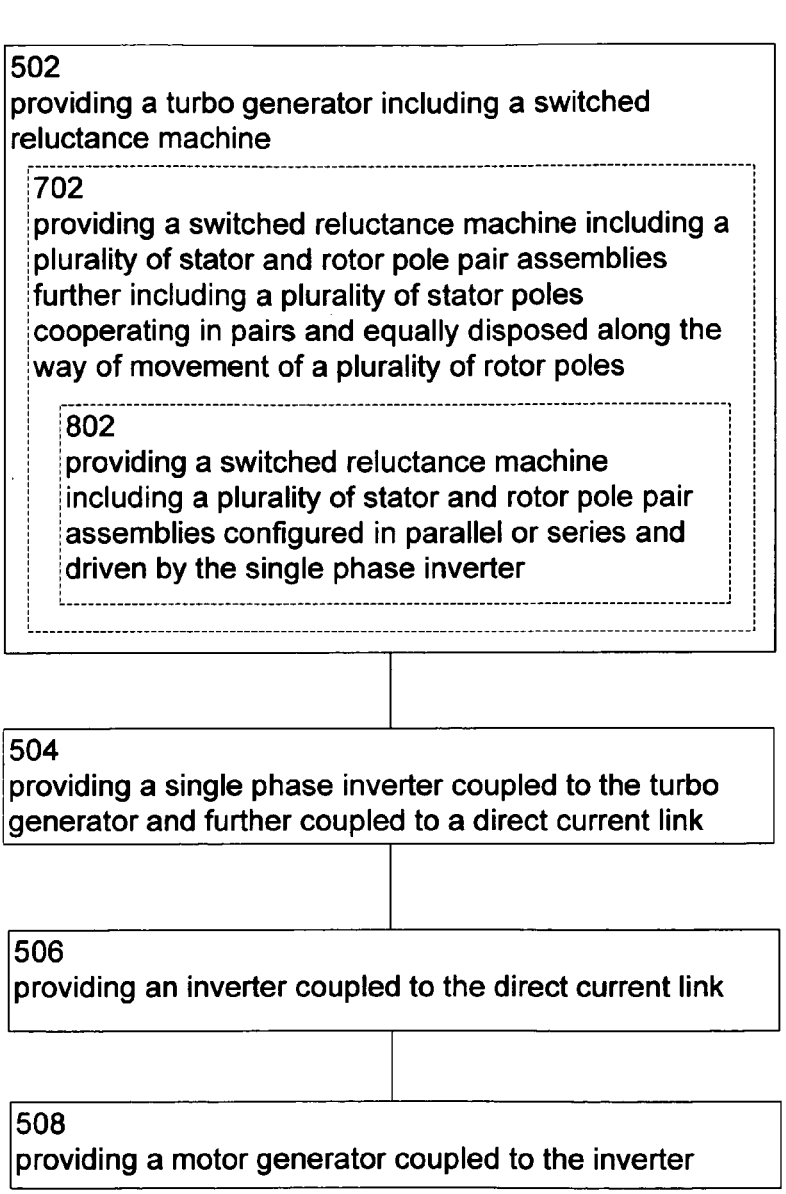

```
                                            500
                                           ↙
┌─────────────────────────────────────────────────┐
│ 502                                             │
│ providing a turbo generator including a switched│
│ reluctance machine                              │
│ ┌─────────────────────────────────────────────┐ │
│ │ 702                                         │ │
│ │ providing a switched reluctance machine     │ │
│ │ including a plurality of stator and rotor   │ │
│ │ pole pair assemblies further including a    │ │
│ │ plurality of stator poles cooperating in    │ │
│ │ pairs and equally disposed along the way    │ │
│ │ of movement of a plurality of rotor poles   │ │
│ │ ┌─────────────────────────────────────────┐ │ │
│ │ │ 802                                     │ │ │
│ │ │ providing a switched reluctance machine │ │ │
│ │ │ including a plurality of stator and     │ │ │
│ │ │ rotor pole pair assemblies configured   │ │ │
│ │ │ in parallel or series and driven by the │ │ │
│ │ │ single phase inverter                   │ │ │
│ │ └─────────────────────────────────────────┘ │ │
│ └─────────────────────────────────────────────┘ │
└─────────────────────────────────────────────────┘
                         │
┌─────────────────────────────────────────────────┐
│ 504                                             │
│ providing a single phase inverter coupled to the│
│ turbo generator and further coupled to a direct │
│ current link                                    │
└─────────────────────────────────────────────────┘
                         │
┌─────────────────────────────────────────────────┐
│ 506                                             │
│ providing an inverter coupled to the direct     │
│ current link                                    │
└─────────────────────────────────────────────────┘
                         │
┌─────────────────────────────────────────────────┐
│ 508                                             │
│ providing a motor generator coupled to the      │
│ inverter                                        │
└─────────────────────────────────────────────────┘
```

FIG. 8

TURBO COMPOUNDING SYSTEM

This invention was made with Government support under DOE Contract No. DE-FC26-05NT42422 awarded by DOE. The Government has certain rights in this invention.

TECHNICAL FIELD

The present invention relates to an engine-powered electric generation system, and, more particularly, to engine-powered electric generations systems with electric turbo compounding.

BACKGROUND

Turbo compounding technologies exploit waste exhaust heat not recovered from a turbocharger. Turbo compounding systems are useful for devices such as tractors, combines and semi-trucks.

SUMMARY

Accordingly, an object of this invention is to provide turbo speed control independent of bus voltage regulation. A system includes, but is not limited to: a turbo generator having a switched reluctance machine having at least one pole-matched rotor and stator pair; a single phase inverter coupled to the turbo generator and further coupled to a direct current link; an inverter coupled to the direct current link; and a motor generator coupled to the inverter. In addition to the foregoing, other computationally implemented method aspects are described in the claims, drawings, and text forming a part of the present disclosure.

In an additional embodiment, a system comprises a turbine coupled to an SR machine, a single phase inverter coupled to the SR machine, a direct current (DC) link coupled to the single phase inverter, a motor/generator inverter having a control coupled to the DC link, and a motor/generator coupled to the motor/generator inverter.

A method includes, but is not limited to: providing a turbo generator having a switched reluctance machine having at least one pole-matched rotor and stator pair; providing a single phase inverter coupled to the turbo generator and further coupled to a direct current link; providing an inverter coupled to the direct current link; providing a motor generator coupled to the inverter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The numerous objects and advantages of the present invention may be better understood by those skilled in the art by reference to the accompanying figures in which:

FIG. 8 illustrates an alternative embodiment of the operational flow of FIG. 5;

DETAILED DESCRIPTION

Figure 1:
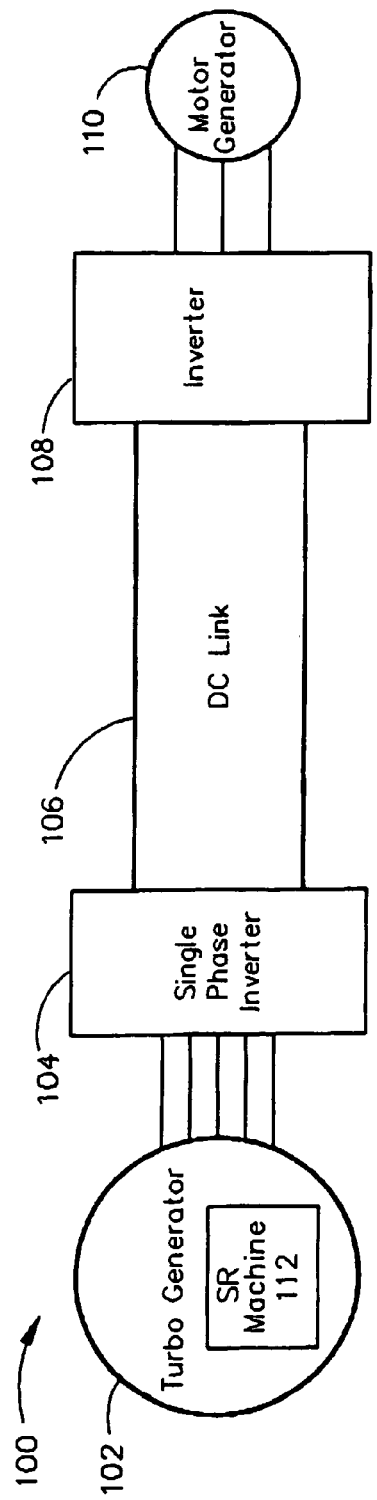
FIG. 1 is a simplified schematic diagram of system according to an exemplary embodiment of the present invention suitable for integration with an engine/electric generator system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, a simplified schematic diagram of system 100 according to an exemplary embodiment of the present invention suitable for integration with an engine/electric generator system. System 100 comprises a turbo generator 102 having a switched reluctance machine 112, a switched reluctance single phase inverter coupled to the turbo generator and further coupled to a direct current link, an inverter coupled to the direct current link, and a motor generator coupled to the inverter. The switched reluctance machine 112 includes at least one pole-matched rotor and stator pair.

Turbo generator 102 may be configured to convert exhaust energy into shaft work. Turbo generator 102 may further convert shaft work into electrical power. Turbo generator 102 may further comprise a switched reluctance machine 112 having a least one pole-matched rotor and stator pair.

Switched reluctance machine 112 may include a plurality of stator poles which are cooperating in pairs and equally disposed along the way of movement of the rotor poles. Stator and rotor pole pairs 1, 2, 3, 4 may be formed such that the poles are co-operating in pairs. For example, a stator pole may co-operate with a corresponding pole of a rotor pole during the turning of the rotor. The stator/rotor pole pair assemblies 1, 2, 3, 4 may be connected to a source of DC voltage. The current is established in the stator coils when the stator and rotor coils are aligned. The voltage remains until the stator and rotor poles are un-aligned.

Figure 3:
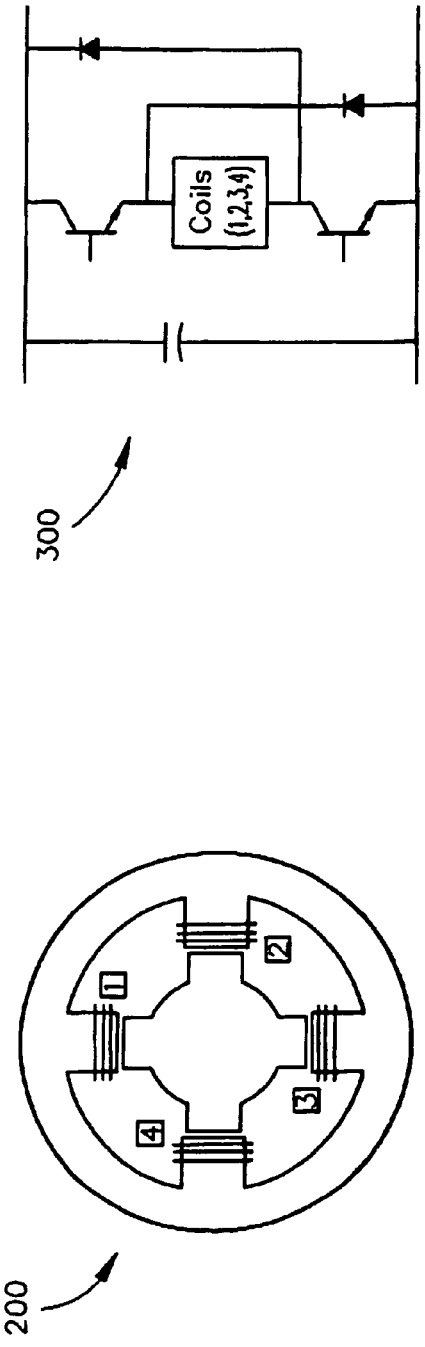
FIG. 3 is a schematic diagram of circuitry of a single phase inverter according to an exemplary embodiment of the present invention.
Figure 2:
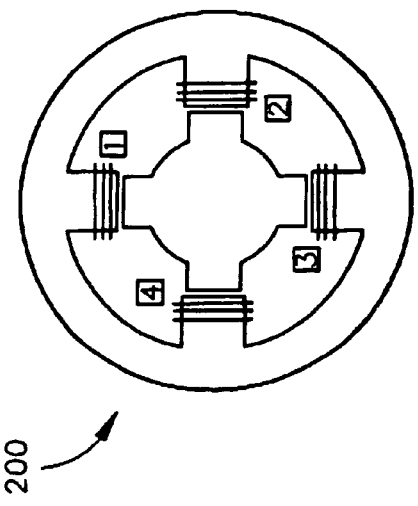
FIG. 2 is a diagram of a stator/rotor assembly of a system according to an exemplary embodiment of the present invention.

Switched reluctance machine 112 may include equivalent rotor and stator poles, as shown in FIG. 2. System stator and rotor pole pair assemblies 1, 2, 3, 4 (FIG. 2) may be configured in parallel or series and may be driven by a single phase inverter. When implemented within the turbo generator, the switched reluctance machine may include a rotor/stator pole match and the windings of the stator and rotor pole pair assemblies 1, 2, 3, 4 may be configured to utilize a single inverter phase, as shown in FIG. 3. The stator windings may be connected, for example, in series, to allow use of a single inverter phase. Voltage regulation may occur on the DC link independent of the turbo generator machine speed regulation.

Specifically, the speed of the turbo generator is controlled by the SR single phase inverter to vary and control the amount of power drawn from the turbo generator. System 100 also provides control of critical speeds during acceleration of the turbo generator while maintaining a higher bus voltage. Further, machine windings may be configured to support a 350 or 750 volt DC bus application, with the machine windings being configured in either parallel or series.

Referring to FIG. 2, a diagram 200 of a switched reluctance machine (i.e. 112 of FIG. 1) of a system 100 according to an exemplary embodiment of the present invention is illustrated. In the embodiment, the switched reluctance machine 112, schematically shown in FIG. 1, comprises a stator and rotor pole pair assemblies 1, 2, 3, 4. The rotor and stator pole pair assemblies 1, 2, 3, 4 may be disposed so as to form pairs of poles in each of which the poles are diametrically opposite each other and the stator poles are evenly distributed along the way of movement of each of the respective rotor poles. The rotor poles may be are situated so as to form a cross and the pole surfaces have an extension along the way of movement of the rotor causing a rotor pole which is just in front of a stator pole to completely match the stator pole. The stator/rotor pole pair assemblies 1, 2, 3, 4 may be connected in either series or parallel.

At least one of the rotors may be formed from a soft magnetic material and the stator poles may be magnetized by means of windings which via terminals (not shown), connect the poles of a pole pair in series or parallel to a DC source such that the poles co-operate to drive the motor in the direction chosen. Between the DC source designated and the respective windings, an electronic switch my be connected which controls the connection of the stator winding to the DC source an the disconnection thereof. The machine 112 may be driven by DC voltage supplied to the windings during predetermined intervals of time, and the motor may be referred to as pulse operated. System rotors may provide rotor containment without magnets having carbon sleeve retention, thereby reducing the cost associated with the plurality of rotors. Rotors and stators included in the rotor and stator pole pairs may be configured with concentrated windings.

The windings in a selected stator pole pair may be connected to the voltage source at the moment when a rotor pole is about to turn in over the stator pole. Disconnection may occur when the rotor pole completely matches with the stator pole. A sensor device may be provided to indicate the position of the rotor poles with respect to the stator poles, for the control of the switched reluctance machine 112. The sensor may be a Hall sensor, an optical sensor, etc.

Single phase inverter 104 may be coupled to the turbo generator 102, or resident within the turbo generator 102. In an additional embodiment, the single phase inverter 104 for the SR machine 112 is housed with the inverter 108 for the motor/generator 110. Single phase inverter 104 may be a single phase alternator configured to produce a single, continuously alternating voltage. Single phase inverter 104 may be configured to drive the windings of the stator/rotor pole pairs 1, 2, 3, 4 (FIG. 2) connected in either series or parallel. System 100 may provide at least 6 power connections to the single phase inverter 104. Referring to FIG. 3, a schematic diagram of circuitry of a single phase inverter according to an exemplary embodiment of the present invention. The single phase inverter 104 may include one or more semiconductors (e.g. IGBT transistors) arranged in a switch mode configuration. Single phase inverter 104 may also include a plurality of diodes such as antiparallel diodes. A path for the maximum inductive load current when the switch is turned off may be provided by one or more diodes connected across each IGBT transistor. Only excitation current may be carried through the IGBT's of the single phase inverter 104. In this manner, the single phase inverter 104 may control the speed of the turbo generator 102. Specifically, the single phase inverter 104 may control acceleration and/or maintain turbo generator speed and vary the amount of power drawn from the turbo generator 102. Generated power may therefore be conducted through diodes to the DC link 106, while voltage remains constant by regulation from the DC link 106. In this manner, required silicon, connectors, gate drivers and control requirements (e.g. for processing) may be reduced, thereby reducing costs associated with constructing the system.

It is contemplated that single phase inverter 104 may include a plurality of electronic components having a control (not shown) for controlling turbo generator speed and delivering DC power.

System 100 may comprise an inverter 108 coupled to the DC link 106. The DC link 106 may be a DC bus such as a regulated vehicle DC link (e.g., implemented within a tractor, diesel truck, combine, etc.). In the configuration illustrated in FIG. 1, voltage regulation may occur on the DC link 106 independent of the turbo generator 102. The inverter 108 may comprise one or more semiconductors arranged in a switch mode configuration. Although the schematic representation of the inverter omits biasing networks and control circuitry for the NPN transistors and other components, such biasing networks and control circuitry for switch mode inverters are generally well known. In one example, the inverter 108 provides a variable frequency drive signal with one or more phases for the motor. In another example, the inverter 108 supports the pulse-width modulation of the inputted DC signal at the inverter input to produce a variable or controllable AC output signal for driving the motor generator 110.

It is contemplated that inverter 108 may include a plurality of electronic components having a control (not shown) for managing the motor generator to regulate BUS voltage.

System 100 may further comprise a motor generator 110. Motor generator 110 may generate power when the turbo generator 102 fails. Motor generator 110 may also couple turbo generating power back to the engine, as illustrated in FIG. 4.

In an additional embodiment, a system may comprise a turbine or a turbo generator coupled to an SR machine, a single phase inverter coupled to the SR machine, a direct current (DC) link coupled to the single phase inverter, a motor/generator inverter having a control coupled to the DC link, and a motor/generator coupled to the motor/generator inverter.

Figure 4:
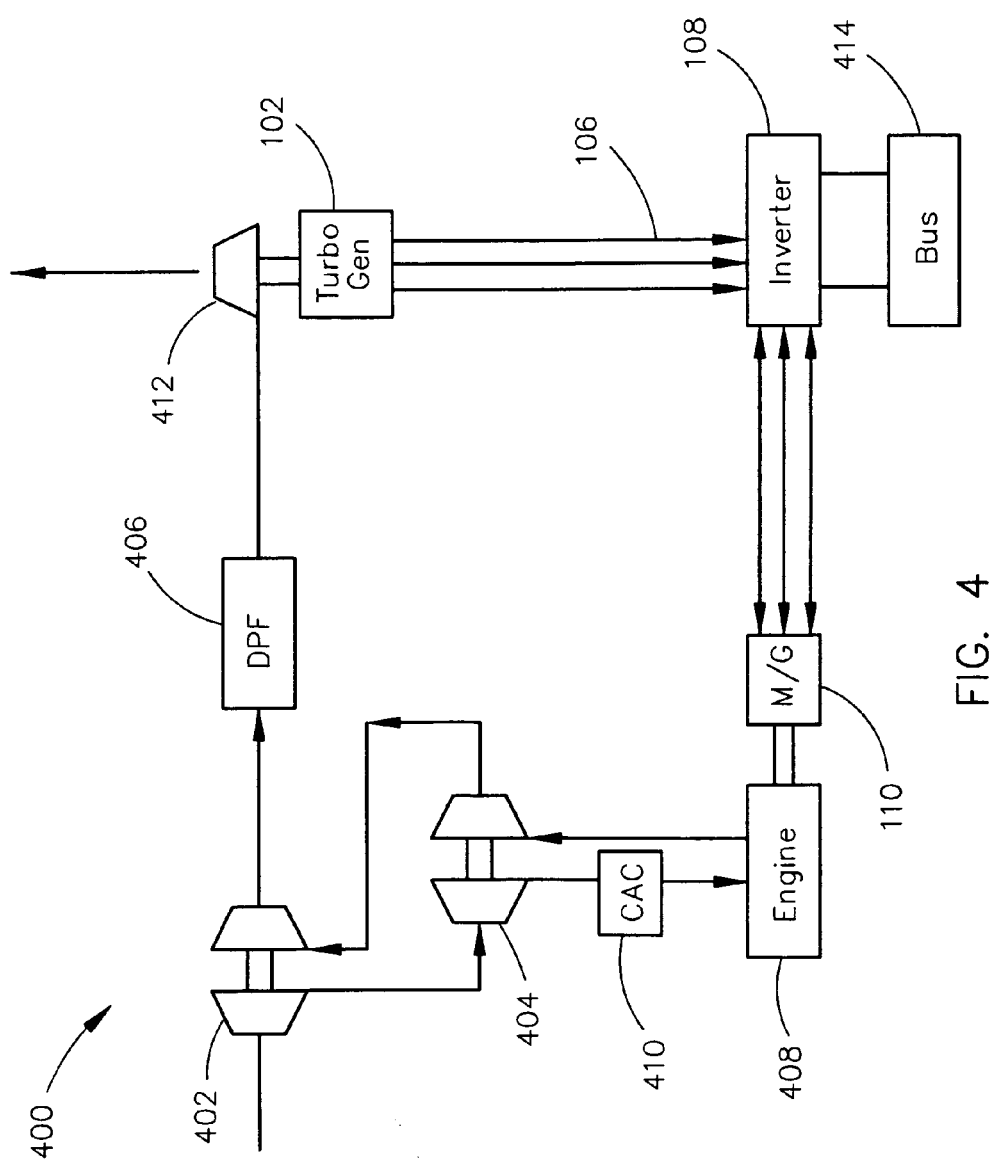
FIG. 4 is a schematic diagram of an engine/electric generator system having a system according to an exemplary embodiment of the present invention.

Referring to FIG. 4, a turbo compounding system 400 including a system 100 according to an exemplary embodiment of the present invention is shown. Turbo compounding system may include any of the components of turbo compounding systems, including the systems, methods and apparatuses described in U.S. Pat. No. 7,047,743 and United States Patent Application Serial Numbers US 2007/0210583 A1, US 2007/0210584 A1, and US 2007/0246942 A1, which are herein incorporated by reference in their entirety. Turbo compounding system may include, for example, at least a portion of the components shown in FIG. 4, including, but not limited to, one or more turbines 402, 404, 412, an engine 408, a charge air cooler (CAC) 410 positioned between at least one of the one or more turbines 402, 406, and the engine 408, a diesel particulate filter (DPF) 406, a turbo generator 102, a regulated DC link 106, an inverter 108 and a bus 414. At least a portion of system 100 may be implemented within at least a portion of turbo compounding system 400.

Figure 5:
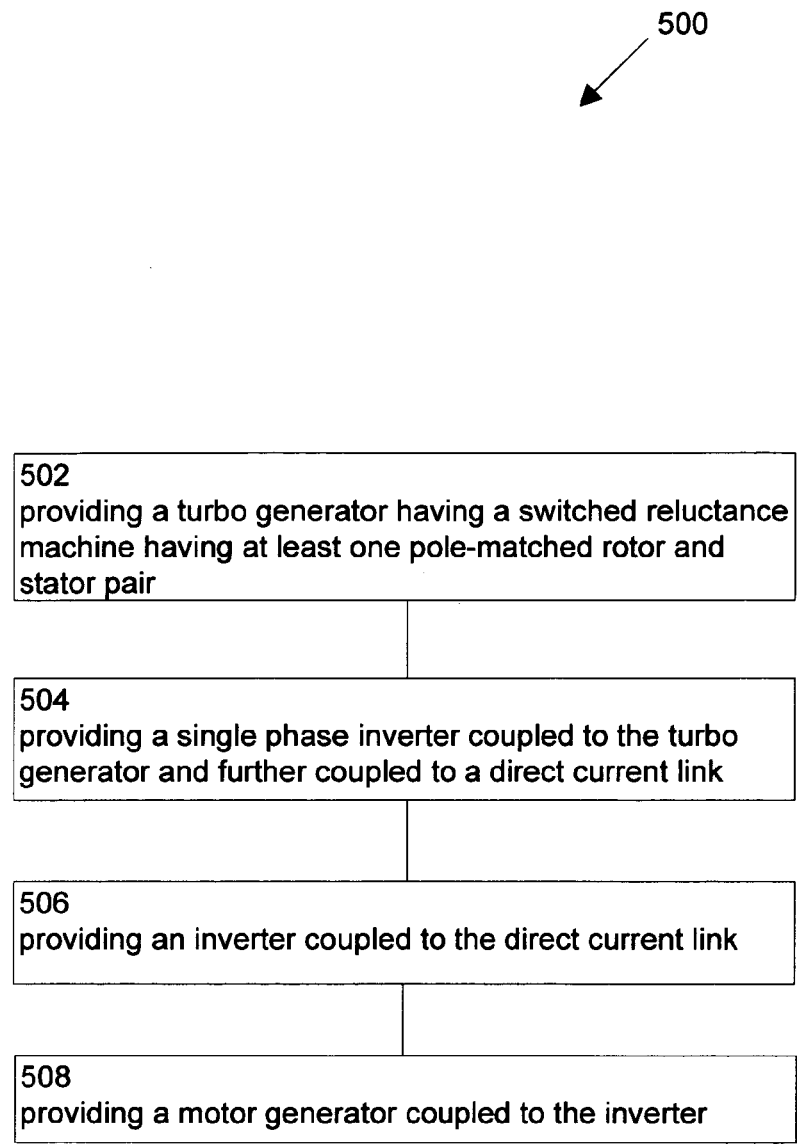
FIG. 5 illustrates an operational flow representing example operations related to providing a method for turbo compounding according to an embodiment of the invention.

Referring to FIG. 5, an operational flow 500 representing example operations related to providing a method for turbo compounding according to an embodiment of the invention is illustrated. In FIG. 5 and in following figures that include various examples of operational flows, discussion and explanation may be provided with respect to the above-described examples of FIGS. 1-4 and/or with respect to other examples and contexts. However, it should be understood that the operational flows may be executed in a number of other environments and contexts, and/or in modified versions of FIGS. 1-4. Also, although the various operational flows are presented in the sequence(s) illustrated, it should be understood that the various operations may be performed in other orders than those which are illustrated, or may be performed concurrently.

Method 500 begins at an operation 502. Operation 502 depicts providing a turbo generator having a switched reluctance machine having at least one pole-matched rotor and stator pair. Operation 504 depicts providing a single phase inverter coupled to the turbo generator and further coupled to a direct current link. Operation 506 depicts providing an inverter coupled to the direct current link. Operation 508 depicts providing a motor generator coupled to the inverter.

Figure 6:
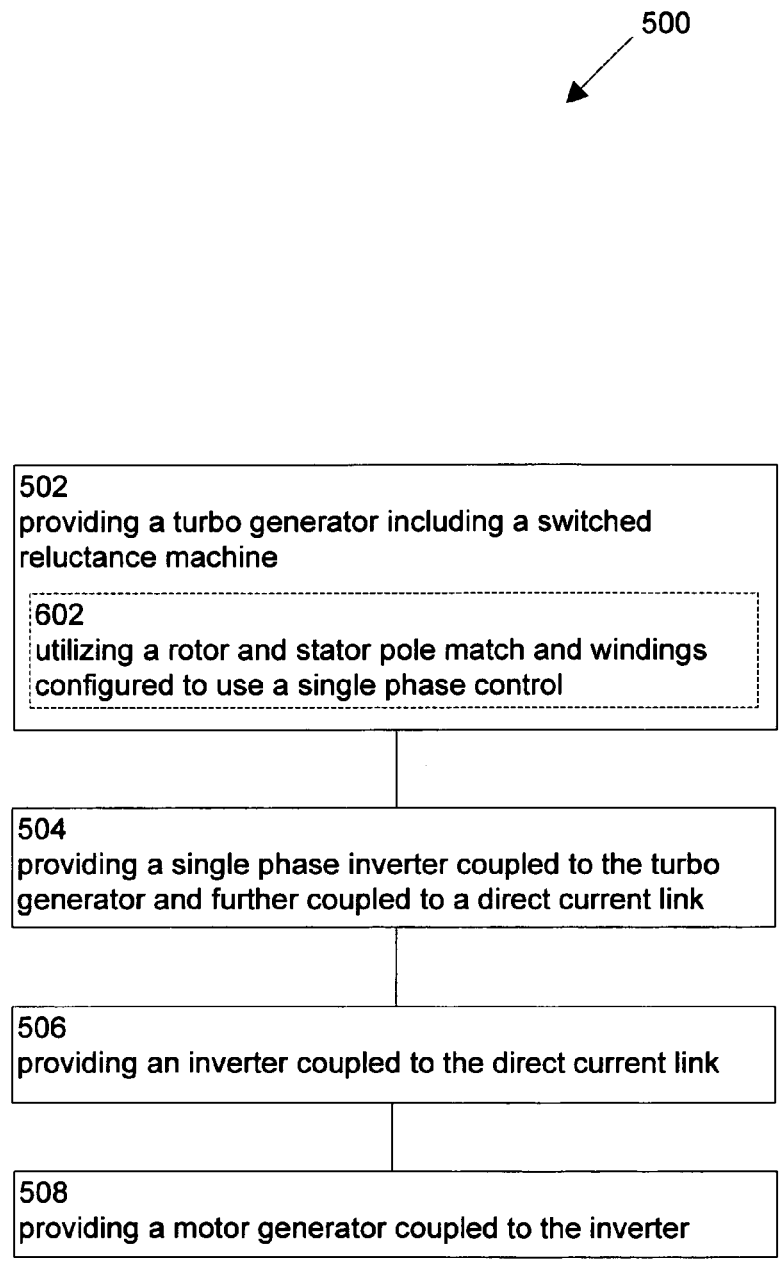
FIG. 6 illustrates an alternative embodiment of the operational flow of FIG. 5.

FIG. 6 illustrates alternative embodiments of the example operational flow 500 of FIG. 5. FIG. 6 illustrates example embodiments where the operation 502 may include at least one additional operation. Additional operations may include an operation 602. The operation 602 depicts the providing a turbo generator having a switched reluctance machine having at least one pole-matched rotor and stator pair includes utilizing a rotor and stator pole match and windings configured to use a single phase control.

Figure 7:
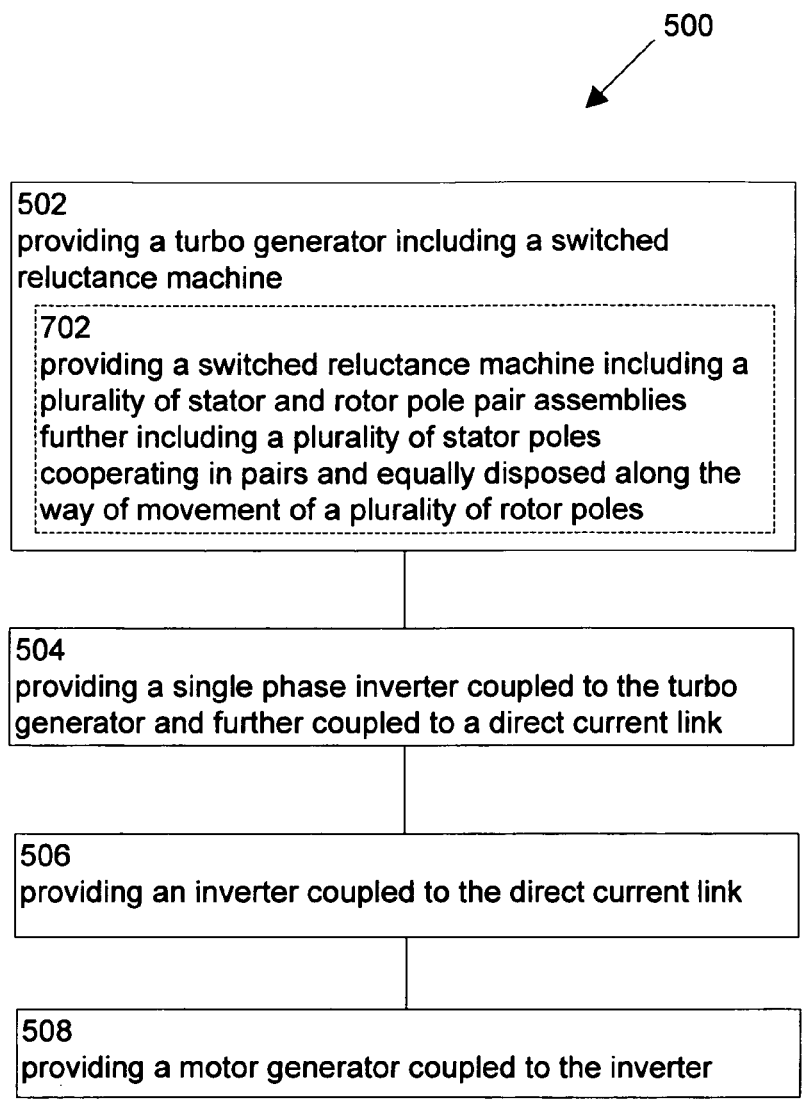
FIG. 7 illustrates an alternative embodiment of the operational flow of FIG. 5.

FIG. 7 illustrates alternative embodiments of the example operational flow 500 of FIG. 5. FIG. 7 illustrates example embodiments where the operation 602 may include at least one additional operation. Additional operations may include an operation 702. The operation 702 depicts providing a switched reluctance machine including a plurality of stator and rotor pole pair assemblies further including a plurality of stator poles cooperating in pairs and equally disposed along the way of movement of a plurality of rotor poles.

FIG. 8 illustrates alternative embodiments of the example operational flow 500 of FIG. 5. FIG. 8 illustrates example embodiments where the operation 504 may include at least one additional operation. Additional operations may include an operation 802. The operation 802 depicts providing a switched reluctance machine including a plurality of stator and rotor pole pair assemblies configured in parallel or series and driven by the single phase inverter.

Figure 9:
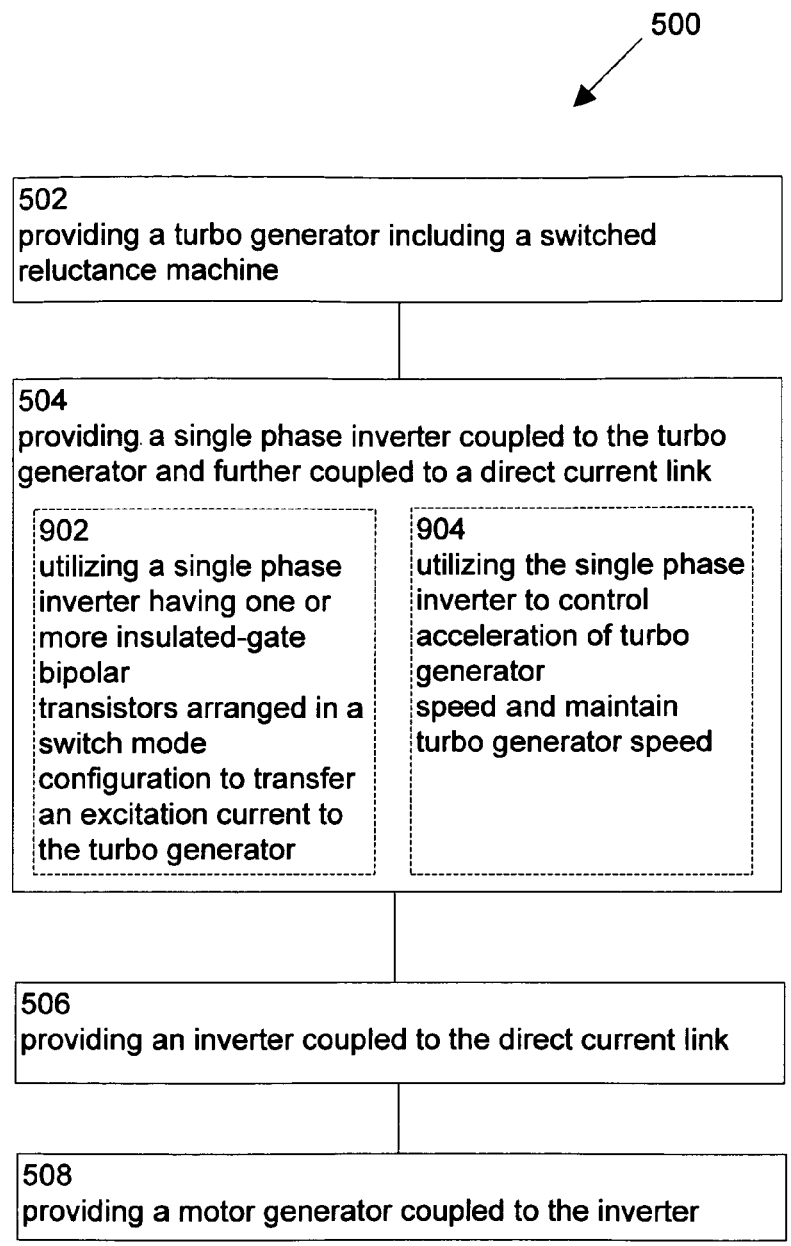
FIG. 9 illustrates an alternative embodiment of the operational flow of FIG. 5.

FIG. 9 illustrates alternative embodiments of the example operational flow 500 of FIG. 5. FIG. 9 illustrates example embodiments where the operation 504 may include at least one additional operation. Additional operations may include an operation 902 and/or an operation 904. The operation 902 depicts utilizing a single phase inverter having one or more insulated-gate bipolar transistors arranged in a switch mode configuration to transfer an excitation current to the turbo generator. The operation 904 depicts utilizing the single phase inverter to control acceleration of turbo generator speed and maintain turbo generator speed.

Figure 10:
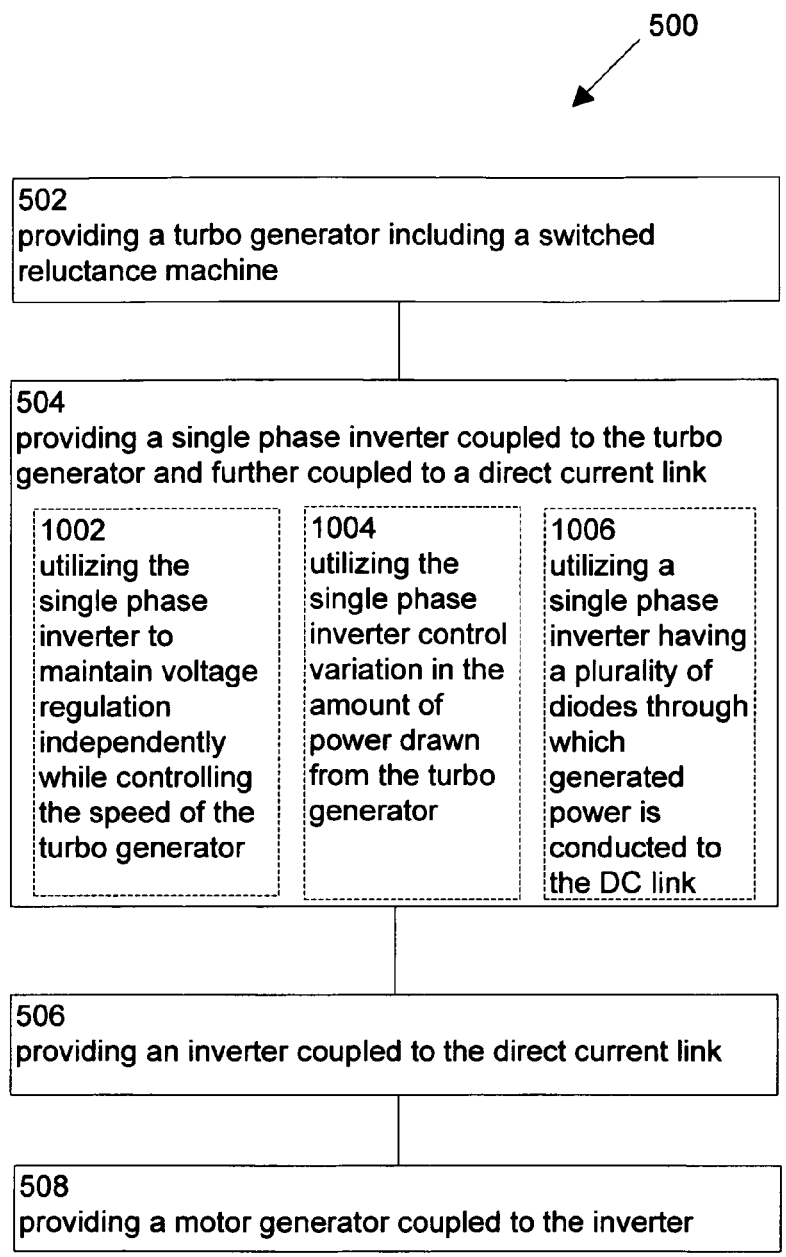
FIG. 10 illustrates an alternative embodiment of the operational flow of FIG. 5.

FIG. 10 illustrates alternative embodiments of the example operational flow 500 of FIG. 5. FIG. 10 illustrates example embodiments where the operation 504 may include at least one additional operation. Additional operations may include an operation 1002, and operation 1004, and operation 1006. The operation 1002 depicts utilizing the single phase inverter to maintain voltage regulation independently while controlling the speed of the turbo generator. The operation 1004 depicts utilizing the single phase inverter control variation in the amount of power drawn from the turbo generator. The operation 1006 depicts utilizing a single phase inverter having a plurality of diodes through which generated power is conducted to the DC link.

Figure 11:
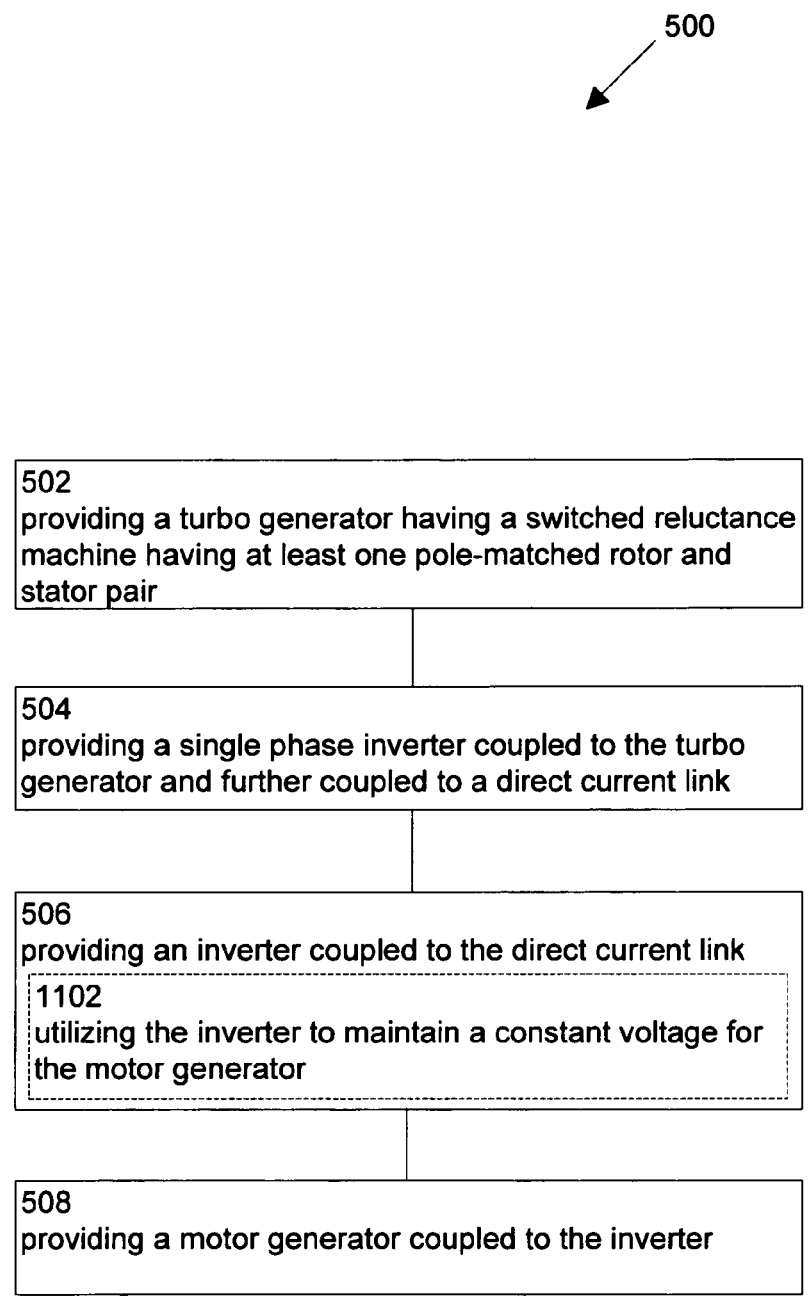
FIG. 11 illustrates an alternative embodiment of the operational flow of FIG. 5

FIG. 11 illustrates alternative embodiments of the example operational flow 500 of FIG. 5. FIG. 11 illustrates example embodiments where the operation 506 may include at least one additional operation. Additional operations may include an operation 1102. The operation 1102 depicts utilizing the inverter to maintain a constant voltage for the motor generator.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A system comprising:
   a turbo generator having a switched reluctance machine having at least one pole-matched rotor and stator pair;
   a single phase inverter coupled to the turbo generator and further coupled to a direct current link, the single phase inverter configured to control speed of the turbo generator by driving the at least one stator and rotor pole pair;
an inverter coupled to the direct current link; and
a motor generator coupled to the inverter.

2. The system of claim 1, wherein the switched reluctance machine includes a plurality of stator and rotor pole pair assemblies further having a plurality of stator poles cooperating in pairs and equally disposed along the way of movement of a plurality of rotor poles.

3. The system of claim 2, wherein the plurality of stator and rotor pole pair assemblies are configured in parallel or series and are driven by the single phase inverter.

4. The system of claim 1, wherein the single phase inverter includes one or more insulated-gate bipolar transistors arranged in a switch mode configuration.

5. The system of claim 4, wherein excitation current is carried through the insulated-gate bipolar transistors of the single phase inverter.

6. The system of claim 1, wherein the single phase inverter includes a plurality of diodes.

7. The system of claim 6, wherein the plurality of diodes are anti-parallel diodes.

8. The system of claim 6, wherein generated power is conducted through the plurality of diodes to the DC link.

9. The system of claim 1, wherein the DC link is configured to maintain a constant voltage for the motor generator.

10. The system of claim 1, wherein the single phase inverter is controls acceleration of turbo generator speed.

11. The system of claim 1, wherein the single phase inverter maintains turbo generator speed.

12. The system of claim 1, wherein the single phase inverter controls variation in the amount of power drawn from the turbo generator.

13. The system of claim 1, wherein the single phase inverter includes a control for controlling turbo generator speed variation and maintenance, and delivering DC power.

14. A method comprising:
providing a turbo generator having a switched reluctance machine having at least one pole-matched rotor and stator pair;
providing a single phase inverter coupled to the turbo generator and further coupled to a direct current link, the single phase inverter configured to control speed of the turbo generator by driving the at least one stator and rotor pole pair;
providing an inverter coupled to the direct current link; and
providing a motor generator coupled to the inverter.

15. The method of claim 14, wherein the providing a turbo generator having a switched reluctance machine having at least one pole-matched rotor and stator pair comprises:
utilizing a rotor and stator pole match and windings configured to use a single phase control.

16. The method of claim 14, wherein the providing a turbo generator having a switched reluctance machine having at least one pole-matched rotor and stator pair comprises:
providing a switched reluctance machine having a plurality of stator and rotor pole pair assemblies further having a plurality of stator poles cooperating in pairs and equally disposed along the way of movement of a plurality of rotor poles.

17. The method of claim 16, wherein the providing a switched reluctance machine having a plurality of stator and rotor pole pair assemblies further having a plurality of stator poles cooperating in pairs and equally disposed along the way of movement of a plurality of rotor poles comprises:
providing a switched reluctance machine having a plurality of stator and rotor pole pair assemblies configured in parallel or series and driven by the single phase inverter.

18. The method of claim 14, wherein the providing a single phase inverter coupled to the turbo generator and further coupled to a direct current link comprises:
utilizing a single phase inverter having one or more insulated-gate bipolar
transistors arranged in a switch mode configuration to transfer an excitation current to the turbo generator.

19. The method of claim 14, wherein the providing a single phase inverter coupled to the turbo generator and further coupled to a direct current link comprises:
utilizing the single phase inverter to control acceleration of turbo generator
speed and maintain turbo generator speed.

20. The method of claim 14, wherein the providing a single phase inverter coupled to the turbo generator and further coupled to a direct current link comprises:
utilizing the single phase inverter to maintain voltage regulation independently
while controlling the speed of the turbo generator.

21. The method of claim 14, wherein the providing a single phase inverter coupled to the turbo generator and further coupled to a direct current link comprises:
utilizing the single phase inverter control variation in the amount of power drawn
from the turbo generator.

22. The method of claim 14, a single phase inverter coupled to the turbo generator and further coupled to a direct current link
utilizing a single phase inverter having a plurality of diodes through which generated power is conducted to the DC link.

23. The method of claim 14, wherein the providing an inverter coupled to the direct current link comprises:
utilizing the inverter to maintain a constant voltage for the motor generator.

24. A turbo compounding system comprising:
at least one turbine;
an engine;
a charge air cooler positioned between the at least one turbine and the engine;
a diesel particulate filter;
a turbo generator having a switched reluctance machine having at least one pole-matched rotor and stator pair;
a single phase inverter coupled to the turbo generator and further coupled to a direct current link, the single phase inverter configured to control speed of the turbo generator by driving the at least one stator and rotor pole pair;
an inverter coupled to the direct current link;
a motor generator coupled to the inverter; and
a bus.

* * * * *